United States Patent [19]

Rayment et al.

[11] 4,354,099

[45] Oct. 12, 1982

[54] ELECTRONIC IDENTIFICATION SYSTEM

[75] Inventors: David J. Rayment, Surrey; Hendrik R. Kruger, Richmond, both of Canada

[73] Assignee: Computrol Systems, Ltd., Vancouver, Canada

[21] Appl. No.: 161,515

[22] Filed: Jun. 20, 1980

[51] Int. Cl.³ ............................................. G06K 7/08
[52] U.S. Cl. ................................ 235/449; 340/825.34
[58] Field of Search ............... 235/450, 449, 493, 451, 235/435; 340/149 A; 370/113

[56] References Cited

U.S. PATENT DOCUMENTS

| | | |
|---|---|---|
| 2,473,664 | 6/1949 | Taylor . |
| 2,774,060 | 12/1956 | Thompson . |
| 3,015,087 | 12/1961 | O'Gorman . |
| 3,581,017 | 5/1971 | Stevens et al. ...................... 370/113 |
| 3,699,311 | 10/1972 | Dunbar ............................. 235/451 |
| 3,967,161 | 6/1976 | Lichtblau . |

FOREIGN PATENT DOCUMENTS

| | | |
|---|---|---|
| 1180277 | 2/1970 | United Kingdom . |
| 1249061 | 10/1971 | United Kingdom . |
| 1233260 | 5/1971 | United Kingdom . |
| 1352818 | 5/1974 | United Kingdom . |
| 1459185 | 12/1976 | United Kingdom . |
| 2046968 | 11/1980 | United Kingdom . |

OTHER PUBLICATIONS

"Metal Detectors", *The Illustrated Science and Invention Encyclopedia*, pp. 1488-1490, published by H. S. Stuttman Co., Inc., 1977.

*Primary Examiner*—Thomas A. Robinson
*Attorney, Agent, or Firm*—Klarquist, Sparkman, Campbell, Leigh, Whinston & Dellett

[57] ABSTRACT

An electronic identification system for reading a predefined identifier code. A preferred application provides a credit card sized "identifier" which includes an array of electrical inductors, some of which are electrically connected in a selected pattern to define the identifier code. The identifier may be positioned closely proximate to a substantially identical inductor array included in a "reader" so that each identifier inductor is centered over a corresponding reader inductor. An alternating current is applied to each reader inductor in turn to induce an electromagnetic field in the region surrounding the driven inductor. The electromagnetic field so produced induces a voltage across the identifier inductor centered over the driven reader inductor. If that identifier inductor is electrically connected to another identifier inductor(s) a current will flow in the other inductor(s) and a second electromagnetic field will be generated in the region(s) surrounding the connected inductor(s). The second electromagnetic field induces a voltage across reader inductor(s) centered under the connected inductor(s). Each reader inductor is separately sensed. If a current output signal is sensed at reader inductor(s) other than the driven inductor, it may be assumed that identifier inductor(s) corresponding to the driven inductor and to the reader inductor(s) at which an output signal is sensed have been electrically connected. A master control device may thus determine the identifier code by noting those identifier inductors which are electrically connected.

12 Claims, 6 Drawing Figures

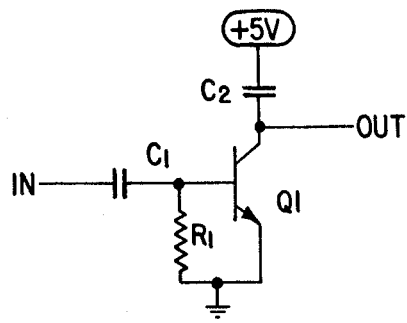
FIG. 3
FIG. 4
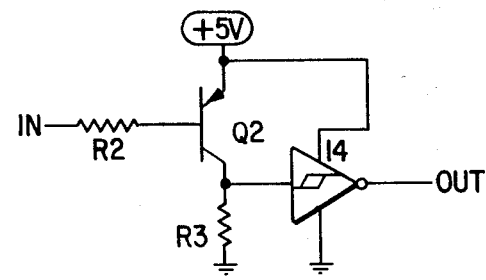
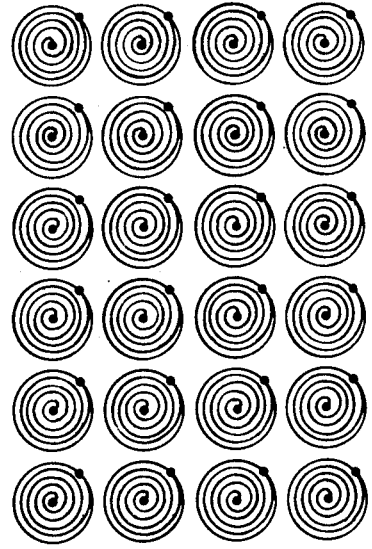
FIG. 5

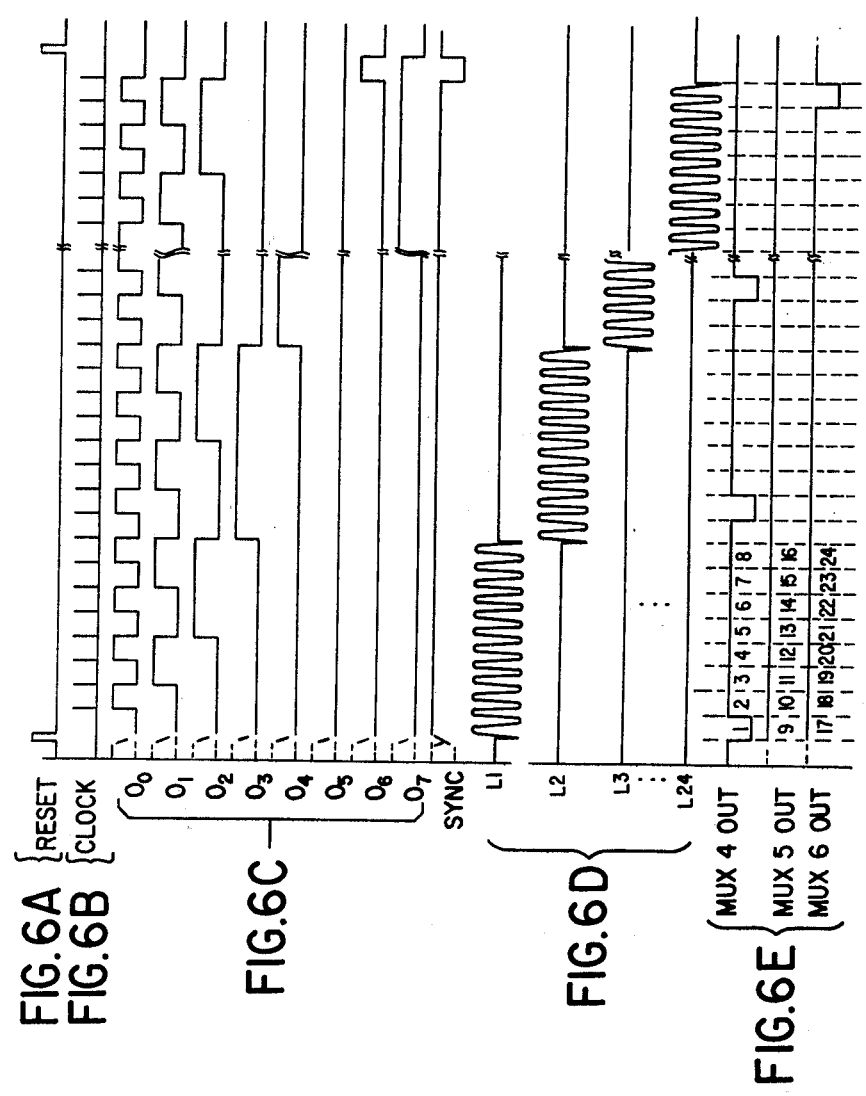

ELECTRONIC IDENTIFICATION SYSTEM

FIELD OF THE INVENTION

This invention relates to electronic identification systems and, in particular, electronic identification systems which sense ("read") the electromagnetic characteristics of an identifier which bears an identifier code.

BACKGROUND OF THE INVENTION

Several types of electronic identification systems are known. Optical systems typically provide electronic means for optically reading features presented in a defined pattern (typically holes in a punched card) which comprises an identifier code recognizable by the system. Optical systems suffer several disadvantages including the fact that they are frequently easily circumvented since the optical identifier code is often easily duplicated. Furthermore, optical systems may suffer a degradation in performance due to wearing of the optically-encoded identifier and due to the presence of dirt or other foreign matter on either the optical reader, the identifier, or both.

Magnetically encoded electronic identification systems usually offer better security than optically encoded systems since the magnetic code on an identifier is invisible (typically, the identifier comprises a substrate having a strip of magnetic material which is magnetized in a predetermined pattern which defines the identifier code). However, magnetic systems suffer several disadvantages including susceptibility to wear (for example, a magnetic oxide strip placed upon a card-type identifier substrate may eventually wear off); the magnetic code on the identifier may be accidentally altered or erased; and, dirt or other foreign matter on the magnetic reader, the identifier, or both, may degrade system performance by introducing errors when the system attempts to read the code on the identifier.

An object of the present invention is to provide an electronic identification system which offers security comparable to or better than that attainable by other systems while circumventing the disadvantages discussed above. A particular object is to provide an electronic identification system having a reader which may be used outdoors. A related object is to provide such a system which does not impose severe constraints upon parameters such as the required distance between the identifier and the reader, if the identifier code is to be read successfully. For example, a magnetically encoded identifier must typically be positioned no more than about 0.003 inches from the magnetic reader if the magnetic identifier code is to be read successfully. An object of the present invention is to provide an electronic identification system which may operate if the gap between the reader and the identifier is about 0.05 inches. A further related object is to provide such a system which will operate if a substantial portion of the gap between the reader and the identifier includes accumulated dirt or other foreign matter.

SUMMARY OF THE INVENTION

The invention is directed to an electronic identification system, comprising drive means for producing a first electromagnetic field at a first location, the drive means including a first electrical inductor about which the first electromagnetic field is induced in response to an applied current detector means for producing an output signal upon detection of a second electromagnetic field at a second location where the first electromagnetic field has a negligible effect upon the detector means, the detector means including a second electrical inductor in which the output signal is induced when the second electromagnetic field surrounds the second inductor and identifier means for sensing the first electromagnetic field and for producing the second electromagnetic field in response to sensing of the first electromagnetic field, the identifier means including a third electrical inductor and a fourth inductor connected in series with the third electrical inductor; the identifier means being physically separable from the drive means and from the detector means.

In one embodiment, the invention provides an electronic identification system, comprising a plurality of drive means, each separately responsive to an applied current to produce a first electromagnetic field, and each including at least one electrical inductor for producing the first electromagnetic field; a plurality of detector means, each separately responsive to an applied second electromagnetic field to produce an output signal and each including at least one electrical inductor responsive to the second electromagnetic field; and identifier means for detecting the first electromagnetic field and producing the second electromagnetic field in response thereto.

Advantageously, means are provided for selectively applying a current to one of the drive means, thereby producing the first electromagnetic field. Means may also be provided for scanning each of the detector means to detect the second electromagnetic field.

Preferably, the identifier means is physically separable from the drive means and from the detector means.

The identifier means includes means for sensing the first electromagnetic field and for producing the second electromagnetic field in response to sensing of the first electromagnetic field.

The invention also provides an electronic identification system, comprising a first array of electrical inductors, means for applying a current to one of the inductors to produce a first electromagnetic field, means for scanning each inductor in the first array to detect a second electromagnetic field at another inductor in the first array, and identifier means including a second array of electrical inductors substantially identical to the first array. Advantageously, the identifier is physically separable from remaining components of the electronic identification system. Two or more inductors of the second array are electrically connected whereby, when the inductors of the second array are centred over corresponding inductors of the first array and placed closely proximate thereto, a current applied to an inductor in the first array induces the first electromagnetic field which induces a current in an adjacent inductor of the second array which induced current produces the second electromagnetic field in other inductors of the second array which are electrically connected to the adjacent inductor.

BRIEF DESCRIPTION OF THE DRAWING

FIG. 3 is an electronic schematic circuit diagram of one of the drive amplifiers included in FIG. 2;

FIG. 4 is an electronic schematic circuit diagram of one of the sensors included in FIG. 2;

FIG. 5 is a plan view of one side of an inductor array which may be included in either the identifier or the reader of a 24 inductor electronic identification system; and, FIG. 6 is a graph including representative waveforms illustrative of the sequence of operations of the reader of FIG. 2.

DESCRIPTION OF A PREFERRED EMBODIMENT

The electronic identification system to be described includes a "reader" and a separate "identifier". A separate identifier would be provided for each individual, piece of equipment, or the like which is to be "identified". The reader includes electronic circuitry for detecting a code which has been included (as hereinafter described) on a given identifier.

It is to be understood that the reader is to be controlled by a master control device (such as a computer) capable of causing the reader to perform its various intended functions, analyzing the results of the reader's performance and taking appropriate steps as desired, depending upon the particular application. The description of the preferred embodiment deals with one way that the master control device might control the reader. However, the construction and operation of the master control device is not considered to form a part of the invention. Accordingly, no detailed description of the master control device is included herein. Similarly, the invention may be applied to a wide range of uses such as access control systems, identity monitoring systems, point of sale terminals, or the like. Depending upon the particular application, the master control device might simply record the time of day and the code of a particular identifier presented to the reader. In some applications, presentation of a specific identifier might cause the master control device to enable access to controlled premises or equipment. Such applications are described by way of example only and are not to be taken as limiting the scope of the invention defined in the appended claims.

Figure 1:
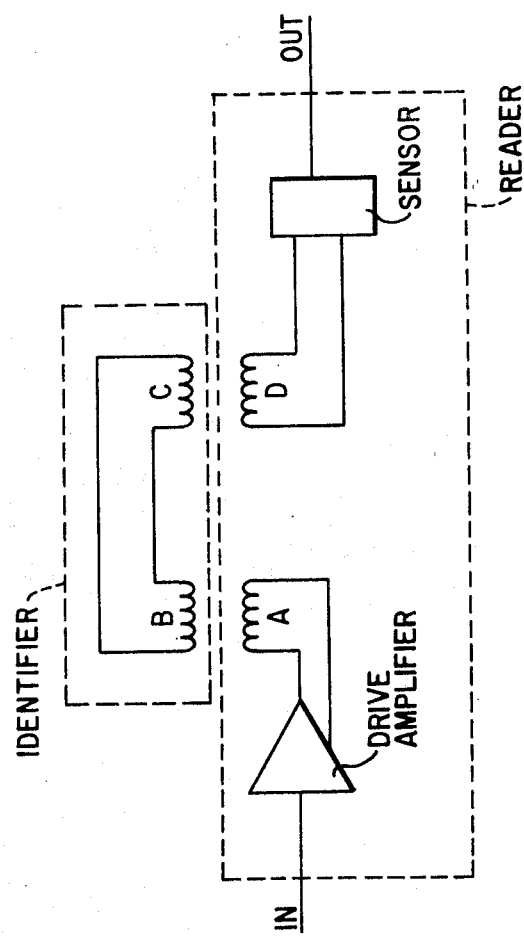
FIG. 1 is a simplified schematic diagram of an electronic identification system having 2 inductors in the "reader" and 2 inductors on the "identifier"

FIG. 1 depicts a simplified electronic identification system which illustrates the principle of operation of the present invention. The reader includes an inductor A positioned at a first location, and an inductor D positioned at second location. A drive amplifier is electrically connected to inductor A to form a drive means. A sensor is electrically connected to inductor D to form a detector means.

The identifier comprises a pair of inductors B and C which are fixed on a substrate in the same relative location that inductors A and D are positioned relative to one another. Thus, if the identifier is physically removed from the reader, it may later be repositioned with respect to the reader with inductors A and B closely proximate one another and centered over (or under, or beside, as the case may be) one another and with inductors C and D closely proximate one another and centered with respect to one another.

If the drive amplifier of FIG. 1 is energized to cause an alternating current to flow in inductor A (and assuming that inductors A and D on the one hand and inductors B and C on the other are positioned sufficiently far apart that the effects of any mutual inductance between inductor pairs is negligible) then a first electromagnetic field will be induced in the region surrounding inductor A. If inductor B is positioned sufficiently close to inductor A, then the electromagnetic field surrounding inductor A will induce a voltage across inductor B. If inductor B is connected to inductor C, then a current will flow in inductor C, and a second electromagnetic field will be induced in the region surrounding inductor C. Inductors B and C thus serve as an identifier means for sensing the first electromagnetic field and for producing the second electromagnetic field in response to sensing of the first electromagnetic field. If inductor D is positioned sufficiently close to inductor C, then the second electromagnetic field will induce a current in inductor D which current may be used by the detector means to produce an output signal for detection by the master control device.

Inductors B and C each have two terminals which may be connected together in series in one of two different ways (i.e. corresponding terminals on each inductor may be connected together or, alternatively, the two terminals may be cross-connected). The phase of the current signal induced to flow in inductor D will depend upon the method selected to connect the terminals of inductors B and C together.

The apparatus of FIG. 1 comprises a 2 inductor "electronic identification system" having an identifier which may include one of two different identifier codes corresponding to the two possible methods for connecting inductors B and C. The master control device may control the reader by applying an alternating current signal to the drive amplifier to induce an electromagnetic field in the region surrounding inductor A. Concurrently, the master control device may examine the output of the detector means to detect a current induced in inductor D in response to an electromagnetic field surrounding inductor D. If an appropriate output signal is not detected at the output of the detector means then several interpretations are possible:

(1) no identifier is positioned near the inductors included in the reader; or, (2) the inductors on the identifier are not centred over those in the reader (and thus the induced electromagnetic field(s) will not surround appropriate adjacent inductors on either the reader or the identifier); or, (3) the inductors on the identifier are not connected together (Thus, no current flows in inductor C. The second electromagnetic field is therefore not present, and no current is induced in inductor D); or, (4) the electrical characteristics of the inductors on the identifier are different than those expected, resulting in production of an output signal of unexpected magnitude.

If an appropriate output signal is not detected, then the master control device should simply assume that an identifier having a "valid" identifier code has not been detected. If the particular application involves, for example, an access control system, then the master control device would deny access to the controlled premises, equipment, etc. and possibly take other action such as sound an alarm.

Of course, the "electronic identification system" illustrated in FIG. 1 may not be of great practical value because the number of different possible identifier codes is severely limited. Preferably, an electronic identification system should provide a relatively large number of different possible identifier codes. If more inductors are provided, then the number of possible ways of interconnecting the inductors to form different identifier codes is increased.

FIGS. 2 through 6 depict a practical electronic identification system which includes 24 inductors in the "reader" and 24 inductors in the "identifier". 24 Inductors have been selected since these may, as discussed below, be interconnected in a relatively large number of ways, each of which may constitute a different identifier code. Also, 24 inductors of a size offering acceptable electrical characteristics may conveniently be placed on a credit card sized substrate which is easily carried on the person.

To simplify the description of the preferred embodiment, a number of assumptions are made. First, it is assumed that inductors on the identifier are only to be interconnected in pairs, although no restriction is placed on the total number of connected inductor pairs. That is, there may be from 1 to 12 pairs of connected inductors on the identifier. (If three or more inductors are to be interconnected, then the threshold of the output signal induced by the second electromagnetic field may be lowered, which may necessitate a modification to the reader so that such low level signals may be detected). Second, although a given inductor pair may be interconnected in two different ways, the resulting differences in phase of the induced current output signal are ignored. That is, it is assumed that inductor pairs are either "connected", or "not connected" without regard to the manner of connection. Even if these simplifying assumptions are made, it can be shown that it is still possible to connect the 24 inductors on the identifier in over $3.78 \times 10$—different ways. It is to be noted however that these simplifying assumptions are not intended to limit the scope of the invention as defined in the appended claims.

FIG. 5 is a plan view of a 24 inductor array which may be included in either the reader or the identifier. The inductor array for either the identifier or the reader may be formed on one side of a credit card-sized piece of conventional printed circuit board substrate. Conventional printed circuit techniques may be used to etch 24 helical coils on the substrate, each coil comprising an electrical inductor. This technique is desirable because the resulting array may be made relatively flat and the identifier can thus be small and easily carried on the person. The other side of the substrate (not shown) provides connection terminals for each inductor. It has been found that a pattern of 24 helical coils, each having an overall diameter of about 0.5 inch, and each comprising 8 turns of 0.015 inch wide $\times$ 0.001 inch thick copper conductor may conveniently be etched on a credit card-sized substrate.

Preferably, the inductor arrays for both the reader and the identifier are fabricated from the same printed circuit artwork to ensure that inductors included in the reader array will have the same relative spacings as corresponding inductors included in the identifier array. Thus, the inductor array on the identifier may be positioned with each identifier inductor centred over (or under, or beside, as the case may be) a corresponding inductor of the reader array. This is important to ensure that an electromagnetic field induced about an inductor in one array will surround a corresponding inductor in the other array. Usage of the same printed circuit artwork to fabricate both the identifier and reader inductor arrays also ensures that the electrical characteristics of individual inductors will be more or less uniform so that the reader need not compensate for fluctuations in the output signal caused by the presence of inductors of differing electrical characteristics. (However, some tolerance is acceptable since it is only necessary to determine whether or not a given inductor pair on the identifier has been connected—theoretically, any current induced to flow by the second electromagnetic field should indicate the presence of a connected inductor pair on the identifier). Although a satisfactory inductor array might be constructed by mounting individual inductor circuit components on a substrate, it is believed that this would lead to problems in positioning of the inductors with respect of one another, would result in a relatively bulky identifier, and would also likely be a labour-intensive procedure and therefore relatively costly.

An identifier having a given code may be constructed by connecting one or more selected pairs of inductors in a given pattern. (In this manner a plurality of distinct identifier codes may be provided. The master control device may be programmed to recognize each such code and, depending upon the particular application, to take appropriate action upon detection of a specified identifier code.) The identifier substrate may then be encapsulated in an opaque material such as epoxy to prevent physical damage to the inductor array and to prevent visual inspection of the inductor connection pattern. The inductors included in the reader array are not interconnected and need only be encapsulated to protect them from physical damage.

Figure 2:
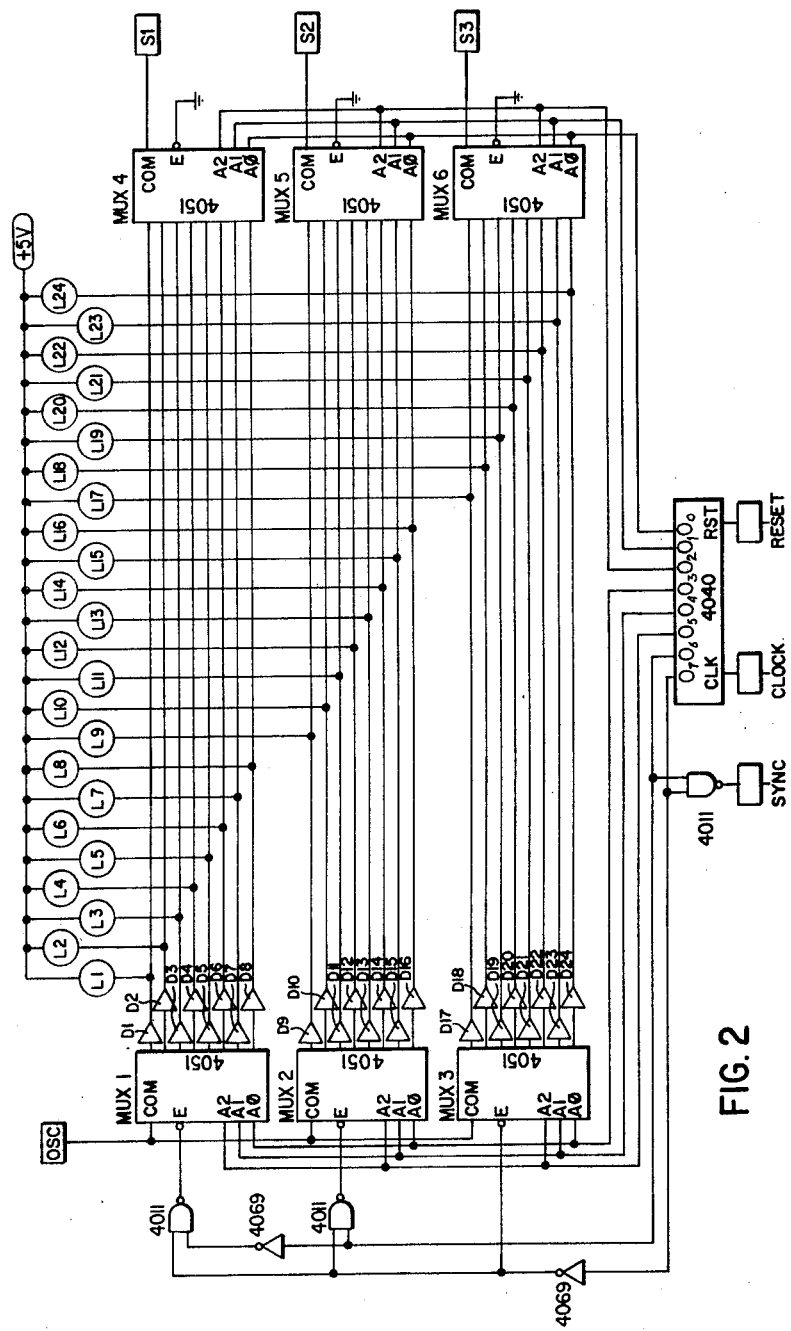
FIG. 2 is an electronic schematic circuit diagram of a reader having 24 inductors.

FIG. 2 is an electronic schematic circuit diagram of a reader for a 24 inductor electronic identification system. For ease of illustration, the 24 inductors included in the reader array are shown side-by-side as L1 through L24 respectively. In practice, these would appear in an array substantially identical to the inductor array on the identifier.

The reader also includes drive amplifiers and sensors which serve analogous functions to those discussed with reference to FIG. 1. 24 separate drive amplifiers D1 through D24 are provided—one for each of inductors L1 through L24. To simplify the reader control procedures, the 24 drive amplifiers are arranged in three groups of 8 drive amplifiers each (the groups are, respectively, drive amplifiers D1 through D8, D9 through D16, and D17 through D24). Three multiplexers, MUX1, MUX2, and MUX3 are provided to sequentially activate the drive amplifiers as hereinafter described. As shown in FIG. 2, the output of drive amplifier D1 is electrically connected to one terminal of inductor L1 to form a first drive means, the output of drive amplifier D2 is electrically connected to one terminal of inductor L2 to form a second drive means, and so on. The second terminals of each of inductors L1 through L24 are connected to the inductor supply voltage. (The "inductor supply voltage" should be distinguished from the "reader supply voltage". In the preferred embodiment, the reader supply voltage is 12 volts. The oscillator voltage was selected to range between 0 and 10 volts. The inductor supply voltage is thus 5 volts—the mid-range of the oscillator voltage. It is important that the reader supply voltage exceed the oscillator voltage in order to prevent damage to the multiplexors).

FIG. 3 is an electronic schematic circuit diagram representative of each of drive amplifiers D1 through D24. A drive signal (the output of the oscillator discussed below) may be applied via capacitor $C_1$ to the base of transistor $Q_1$. Resistor $R_1$ provides biasing for $Q_1$. Capacitor $C_2$ "tunes" the drive amplifier for a given oscillator frequency and inductor geometry to ensure optimum energy transfer. (The value of capacitor $C_2$ may be determined experimentally. For example, in a system using helical coil inductors of about 0.5 inches overall diameter comprising 8 turns of 0.015 inch by 0.001 inch copper conductor fabricated on a standard epoxy glass printed circuit substrate and used in a system having an oscillator frequency of 10 Mhz., a value of 820 pf was found appropriate for $C_2$.) The drive amplifier output signal appears at the collector of transistor $Q_1$.

The reader also includes three sensors S1, S2 and S3. As hereinafter described, the input terminal of sensor S1 may be selectively connected to one of inductors L1 through L8 to form a first detector means. Similarly, sensor S2 may be selectively connected to one of inductors L9 through L16, and sensor S3 may be selectively connected to one of inductors L17 through L24.

FIG. 4 is an electronic schematic circuit diagram representative of each of sensors $S_1$, $S_2$ or $S_3$. If no current has been induced to flow in the inductor which is connected to the input terminal of the sensor, then the sensor input will be pulled to the reader supply voltage through the inductor and transistor $Q_2$ will be "off", causing the output of the Schmitt trigger (integrated circuit 74C14) to be in the logic "low" state and its output to be in the logic "high" state. If a current is induced to flow in the inductor which is connected to the input terminal of the sensor, then transistor $Q_2$ will turn "on", pulling the input of the Schmitt trigger "high" and causing its output to be "low". The master control device may examine the output of the Schmitt trigger to determine whether a current is flowing in the inductor connected to the sensor input terminal. If the output of the Schmitt trigger is "low", then the master control device may assume that current is flowing in the inductor connected to the sensor input terminal. If the Schmitt trigger output is "high", it may be assumed that no current is flowing in the inductor connected to the sensor.

The master control device may, as described below, drive each inductor in the reader array and then determine whether a current is induced to flow in any other inductor in the reader array. In this manner the master control device may determine which pairs of inductors on the identifier are connected together and thus "read" the identifier code.

Operation of the reader is described with reference to FIG. 6 which includes representative waveforms. Initially, the master control device applies an appropriate pulse (FIG. 6A) to the scan counter RESET line, resetting the counter to zero. (The scan counter is a conventional binary counter and is designated in FIG. 2 as integrated circuit 4040). The eight output lines $O_0$ through $O_7$ of the scan counter are all in the logic "low" state at this point (FIG. 6C). The master control device then applies an appropriate pulse train or clock signal (FIG. 6B) to the scan counter CLOCK line. Each pulse applied to the scan counter CLOCK line increments the scan counter by one. For example, the first clock pulse applied to the scan counter after the reset pulse results in a logic "high" state on scan counter output line $O_0$ and logic "low" states on scan counter output lines $O_1$ through $O_7$ (FIG. 6C). The next clock pulse results in a logic "high" state on scan counter output line $O_1$ and logic "low" states on scan counter output lines $O_0$ and $O_2$ through $O_7$, (FIG. 6C) etc.

Scan counter output lines $O_0$, $O_1$ and $O_2$ are connected respectively to the $A_0$, $A_1$ and $A_2$ "select" terminals of each of multiplexers MUX4, MUX5 and MUX6. The "enable" terminals (designated "E") of each of multiplexers MUX4, MUX5 and MUX6 are grounded. Since the input to each "enable" terminal is automatically inverted by the particular integrated circuit multiplexer used in the preferred embodiment, multiplexers MUX4, MUX5 and MUX6 are continuously enabled. As scan counter output lines $O_0$, $O_1$ and $O_2$ are sequentially incremented from "0" through to "7" (i.e. the sequence of scan counter output lines $O_0$, $O_1$ and $O_2$ all "low" through to all "high") each of multiplexers MUX4, MUX5 and MUX6 is caused to "select" one of its eight input lines for connection to the input of the sensor coupled to the particular multiplexer. For example, with scan counter output lines $O_0$, $O_1$ and $O_2$ in the "low" state, multiplexer MUX4 will "select" inductor L1 for connection to sensor S1. Similarly, MUX5 "selects" inductor L9 for connection to sensor S2 and MUX6 "selects" inductor L17 for connection to sensor S3. When the scan counter is incremented so that output line $O_0$ is "high" and lines $O_1$ and $O_2$ are "low", MUX4 "selects" inductor L2 for connection to sensor S1, MUX5 "selects" inductor L10 for connection to sensor S2, etc. The scan counter, MUX4, MUX5 and MUX6 thus provide a means for scanning each of the inductor-sensor detector means.

Scan counter output lines $O_6$ and $O_7$ are connected to the "enable" terminals of multiplexers MUX1, MUX2 and MUX3. Two logic inverters and two logic "nand" gates are positioned between scan counter output lines $O_6$ and $O_7$ and multiplexers MUX1, MUX2 and MUX3 such that MUX1 is "enabled" when scan counter output lines $O_6$ and $O_7$ are "low", MUX2 is "enabled" when scan counter output line $O_6$ is "high" and $O_7$ is "low", and MUX3 is "enabled" when scan counter output line $O_6$ is "low" and $O_7$ is "high". Scan counter output lines $O_3$, $O_4$ and $O_5$ are connected to the "select" terminals of multiplexers MUX1, MUX2 and MUX3. As the scan counter is incremented, the oscillator output signal (FIG. 6D—note that the time scale of FIG. 6D has been greatly exaggerated for purposes of illustration) is sequentially applied to each of the 24 inductors through its associated drive amplifier. The scan counter, MUX1, MUX2, MUX3, and the logic gates thus provide a means for selectively applying a current to one of the inductor-drive amplifier drive means.

Scan counter output line $O_0$ represents the "least significant bit" (meaning that it changes state most rapidly as the scan counter is incremented). Scan counter output line $O_7$ represents the "most significant bit" (meaning that it changes state least rapidly as the scan counter is incremented). Scan counter output line $O_3$ changes state only after scan counter output lines $O_0$, $O_1$ and $O_2$ undergo seven changes of state. Thus, the input connected to each sensor may be changed seven times before any one of multiplexers MUX1, MUX2 or MUX3 is activated to "select" a different drive. When one of multiplexers MUX1, MUX2, or MUX3 is activated to select the next output, output lines $O_0$, $O_1$ and $O_2$ will again undergo seven changes of state before another drive means is selected by multiplexers MUX1, MUX2 or MUX3. This means that a single inductor may be continuously driven while multiplexers MUX4, MUX5 and MUX6 each selectively connect eight inductors to sensors S1, S2 or S3. Thus all 24 inductors may be "read" by the master control device while a single inductor is driven.

With multiplexer MUX1 "enabled" and scan counter output lines $O_3$, $O_4$ and $O_5$ "low", MUX1 "selects" drive amplifier D1 to which the oscillator ("OSC") output signal (FIG. 6D) is applied. The oscillator output signal (a 10 Mhz. oscillator output signal has been used) is amplified and coupled to inductor L1, including an electromagnetic field in the region surrounding L1. While L1 is driven, inductors L1 through L8, L9 through L16, and l17 through L24 are sequentially coupled to sensors S1, S2 and S3 respectively. Because L1 is driven, an output signal should be detected when it is coupled to sensor S1 (FIG. 6E). The master control device may use this feature to verify correct operation of the reader. If an identifier having an appropriate inductor array is positioned closely proximate the reader array so that correspnding inductors in each array are centred over (or under, or beside, as the case may be) one another (the chassis housing the reader could provide a guide slot within which the identifier may be inserted for accurate positioning relative to the reader inductor array) an output signal will also be detected from inductors of the reader array which are adjacent inductors on the identifier that are connected to the identifier inductor which is adjacent the driven inductor. The inductors are "sensed" three at a time via sensors $S_1$, $S_2$ and $S_3$. When the eight inductors associated with each sensor have each been "read", the scan counter is incremented by the master control device and the oscillator output signal is applied via drive amplifier $D_2$ to inductor $L_2$. All 24 inductors are again "read" while L2 is driven. (The master control device should maintain a record of connected pairs of inductors by noting those reader inductors in which a current is induced to flow when a given reader inductor is driven). When all reader inductors have been driven and all other reader inductors separately "read", the process is complete. The master control device may compare the connected inductor pairs which have been detected with a given identifier code (or codes) and take appropriate action depending upon the particular application.

It should be noted that each connected inductor pair will be detected twice since both inductors in the pair will be separately driven and an induced current detected in the other inductor of the pair. This "double read" characteristic may be utilized as an error-monitoring feature by the master control device.

The following table lists preferred values for circuit components of a reader constructed for use with a 24 inductor electronic identification system in which the inductors were fabricated as helical coils on a standard epoxy glass substrate. Each coil was about 0.5 inch in diameter and comprised 8 turns of 0.001 inch×0.015 inch copper conductor. An oscillator frequency of 10 Mhz. was used.

| | | |
|---|---|---|
| $C_1$ | .01 μf | |
| $R_1$ | 470 Ω | |
| $Q_1$ | 2N4401 | |
| $C_2$ | 820 pf | |
| $R_2$ | 470 Ω | |
| $Q_2$ | 2N4403 | |
| $R_3$ | 10K Ω | |
| I$_4$ — (SCHMITT TRIGGER) | 74C14 | (integrated circuit) |
| SCAN COUNTER | 4040 | (integrated circuit) |
| NAND GATES | 4011 | (integrated circuit) |
| INVERTERS | 4069 | (integrated circuit) |
| MUX1-MUX6 | 4051 | (integrated circuit) |

It has been found that a reader constructed as described above may operate successfully if the gap between the inductors in the reader and the inductors in the identifier is up to about 0.050 inches. Furthermore, dirt or other foreign matter accumulated on either inductor array does not degrade system performance since the arrays are "coupled" by means of induced electromagnetic fields which may penetrate most foreign matter that would accumulate on the reader or identifier under ordinary field conditions. The system is thus well suited to outdoor use (for example in applications which involve monitoring or controlling access to equipment located outdoors) where relatively substantial accumulations of foreign matter may be expected.

Those skilled in the art will readily appreciate that by programming the master control device in an appropriate manner, very sophisticated electronic identification systems may be constructed. For example, the master control device may be programmed to record the code of each identifier presented to the reader, together with the time of day. A multiplicity of readers may be provided in different locations so that the master control device may keep track of personnel or equipment associated with individual identifiers. In some applications, readers may be included in "point of sale" terminals. Identifiers bearing unique codes could be provided to individual consumers for presentation at a point of sale terminal as a conventional credit card. As another example, an access control system offering excellent security may be constructed by programming the master control device to define a given identifier code as "valid"—upon detection of an identifier bearing that code the master control device may take action to permit access to controlled equipment or premises, log the time of entry, etc. In some applications, more than one identifier code may be defined as "valid" to construct a hierarchy of valid identifier codes and appropriate action may be taken by the master control device upon detection of each. An identifier might also be "disabled" at any time simply by changing the program for the master control device—if desired, one or more new "valid" identifier codes could then be included in the program for the master control device. It is to be noted however that these "features" are all functions (primarily governed by computer programming) of the particular master control device selected, all of which may be accomodated with the preferred embodiment described.

We claim:
1. An electronic identification system, comprising:
   (a) drive means for producing a first electromagnetic field at a first location, said drive means including a first electrical inductor about which said first electromagnetic field is induced in response to an applied current;
   (b) detector means for producing an output signal upon detection of a second electromagnetic field at a second location where said first electromagnetic field has a negligible effect upon said detector means, said detector means including a second electrical inductor in which said output signal is induced when said second electromagnetic field surrounds said second inductor; and,

(c) identifier means for sensing said first electromagnetic field and for producing said second electromagnetic field in response to sensing of said first electromagnetic field, said identifier means including a third electrical inductor and a fourth electrical inductor connected in series with said third electrical inductor, and said identifier means being physically separable from said drive means and from said detector means.

2. An electronic identification system, comprising:
(a) a plurality of drive means, each separately responsive to an applied current to produce a first electromagnetic field, and each including at least one electrical inductor for producing said first electromagnetic field;
(b) a plurality of detector means, each separately responsive to an applied second electromagnetic field to produce an output signal, and each including at least one electrical inductor responsive to said second electromagnetic field; and,
(c) identifier means for detecting said first electromagnetic field and for producing said second electromagnetic field in response thereto.

3. An electronic identification system as defined in claim 2, wherein said identifier means comprises at least two electrical inductors connected in series.

4. An electronic identification system as defined in claim 3, wherein each inductor included in one of said drive means is also included in one of said detector means.

5. An electronic identification system as defined in claim 4, wherein the inductors included in said drive means and in said detector means are positioned in a first array.

6. An electronic identification system as defined in claim 5, wherein said identifier means includes a plurality of electrical inductors positioned in a second array substantially identical to said first array.

7. An electronic identification system as defined in claim 2, further comprising means for selectively applying a current to one of said drive means, thereby producing said first electromagnetic field.

8. An electronic identification system as defined in claim 7, further comprising means for scanning each of said detector means to detect said second electromagnetic field.

9. An electronic identification system as defined in claim 2, 3 or 6 wherein said identifier means is physically separable from said drive means and from said detector means.

10. An electronic identification system as defined in claim 9, wherein said identifier means includes means for sensing said first electromagnetic field and for producing said second electromagnetic field in response to sensing of said first electromagnetic field.

11. An electronic identification system, comprising:
(a) a first array of electrical inductors;
(b) means for applying a current to one of said inductors to produce a first electromagnetic field;
(c) means for scanning each inductor in said first array to detect a second electromagnetic field at another inductor in the first array; and,
(d) identifier means including a second array of electrical inductors substantially identical to said first array; wherein two or more inductors of said second array are electrically connected whereby, when the inductors of said second array are centered over corresponding inductors of said first array and placed closely proximate thereto, a current applied to an inductor in said first array produces said first electromagnetic field, which induces a current in an adjacent inductor of said second array, which induced current produces said second electromagnetic field in other inductors of said second array which are electrically connected to said adjacent inductor.

12. An electronic identification system, comprising:
(a) drive means for producing a first electromagnetic field at a first location, said drive means including a first electrical inductor about which said first electromagnetic field is induced in response to an applied current;
(b) detector means for producing an output signal upon detection of a second electromagnetic field at a second location where said first electromagnetic field has a negligible effect upon said detector means, said detector means including a second electrical inductor in which said output signal is induced when said second electromagnetic field surrounds said second inductor; and,
(c) identifier means for sensing said first electromagnetic field and for producing said second electromagnetic field in response to sensing of said first electromagnetic field, said identifier means including a third electrical inductor and a fourth electrical inductor and means interconnecting said third and fourth electrical inductors.

* * * * *